United States Patent [19]
Dunn et al.

[11] Patent Number: 4,520,550
[45] Date of Patent: Jun. 4, 1985

[54] ROBOT TOOL CHANGER

[75] Inventors: Jimmy L. Dunn, Hurst; George L. Mayo; Frank C. Romeo, both of Fort Worth, all of Tex.

[73] Assignee: Automated Robotic Systems, Inc., Arlington, Tex.

[21] Appl. No.: 498,731

[22] Filed: May 27, 1983

[51] Int. Cl.³ .............................................. B23Q 3/157
[52] U.S. Cl. ..................................... 29/568; 403/349; 409/233; 901/41
[58] Field of Search ....................... 29/568, 264, 26 R; 409/234, 231, 232, 233; 414/736; 901/30, 50, 41, 28, 29; 279/1 TS, 1 TE; 403/349

[56] References Cited
U.S. PATENT DOCUMENTS

| 3,074,147 | 1/1963 | Miller et al. ............... 279/1 TS |
| 3,118,345 | 1/1964 | Bullard et al. ................ 409/233 |
| 3,254,567 | 6/1966 | Daugherty .................... 409/233 |
| 3,445,923 | 5/1969 | Balding ........................... 29/568 |
| 3,452,427 | 7/1969 | Lehmkuhl et al. ............. 29/568 |
| 3,704,510 | 12/1972 | Sedgwick et al. ........ 414/736 X |
| 3,911,540 | 10/1975 | Johnson et al. ............... 29/26 A |
| 3,949,462 | 4/1976 | de Caussin ..................... 29/568 |
| 3,964,616 | 6/1976 | Piotrowski ..................... 414/736 |
| 3,994,061 | 11/1976 | Tomita et al. ............. 409/234 X |
| 4,091,526 | 5/1978 | Nakaso et al. ................. 29/568 |
| 4,328,975 | 5/1982 | Heguy et al. ............. 409/234 X |
| 4,356,609 | 11/1982 | Wollerman ................ 29/568 X |
| 4,414,732 | 11/1983 | Tomita et al. ................. 29/568 |
| 4,437,224 | 3/1984 | Breclow ........................... 29/568 |

Primary Examiner—William R. Briggs
Assistant Examiner—Glenn L. Webb
Attorney, Agent, or Firm—James E. Bradley

[57] ABSTRACT

An apparatus and method for installing and removing a tool on a chuck connected to a robot arm. The chuck has a mandrel with two parallel flat sides and two protruding flanges. The tool has a tool coupling member which is supported and held against rotation by a support plate. The tool coupling member is cylindrical and has two lugs spaced apart to allow the flat sides of the mandrel to pass, but to lock over the flanges of the mandrel when the mandrel is rotated relative to the tool coupling member. A cam follower on the chuck follows a guide slot in the support plate to cause the mandrel to rotate relative to the tool coupling member. The cam follower also causes a key on the chuck to mate or disengage a key slot on the tool coupling member.

17 Claims, 5 Drawing Figures

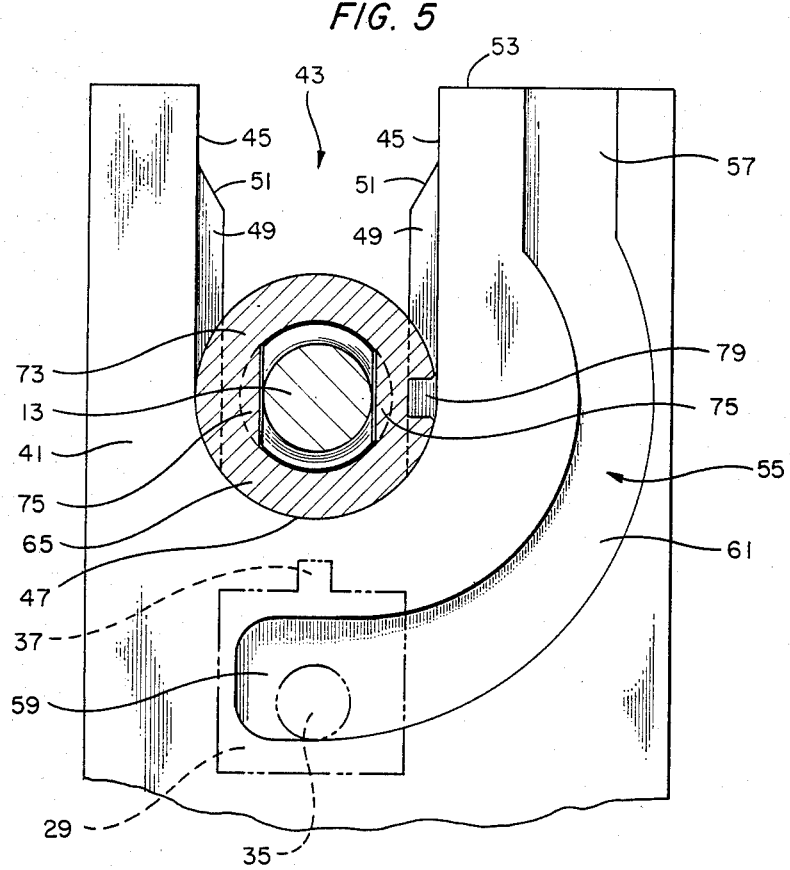

ROBOT TOOL CHANGER

BACKGROUND OF THE INVENTION

1. Field of the Invention

This invention relates in general to tool changing devices and methods, and in particular to devices and methods for changing tools on robot arms.

2. Description of the Prior Art

Robot arms have been developed to utilize a variety of interchangeable tools. When it is necessary, during operations, to change tools, the robot arm experiences an expensive time of non-production. This down-time must be kept to a minimum by providing a fast and easy device and method of changing the tool.

Machine tools, such as drilling machines, also experience down-time during a tool change. In order to speed this operation, various automatic tool changers have been developed for machine tools. U.S. Pat. Nos. 3,452,427; 3,911,540; 3,949,462; and 3,964,616 show some of these devices. There remained a need, however, for a quick and easy way to automatically change tools on a robot arm.

SUMMARY OF THE INVENTION

The general object of this invention is to provide an apparatus and method for installing and removing a tool on a chuck connected to a robot arm.

This object is accomplished by providing coupling members on the tool and chuck, adapted to mate with one another. A locking mechanism on the coupling members secures the tool to the chuck whenever the coupling members are aligned in a locked position. When the coupling members are rotated a selected distance of less than 360° relative to one another, the locking mechanism releases the coupling members.

A support is provided to receive the tool coupling member and to hold the coupling member against rotation. A guide mechanism causes the chuck coupling member to rotate relative to the tool coupling member as the chuck is moved relative to the support.

A key and key slot may be provided on ensure proper orientation of the tool on the chuck. In such a case, the guide mechanism must disengage the key as the chuck coupling member is rotated. In the preferred embodiment the guide mechanism is a cam and cam follower arrangement.

The above as well as additional objects, features and advantages of the invention will become apparent in the following detailed description.

BRIEF DESCRIPTION OF THE DRAWING

FIG. 5 is a sectional top view, taken along lines V—V in FIG. 4.

DESCRIPTION OF THE PREFERRED EMBODIMENT

Figure 1:
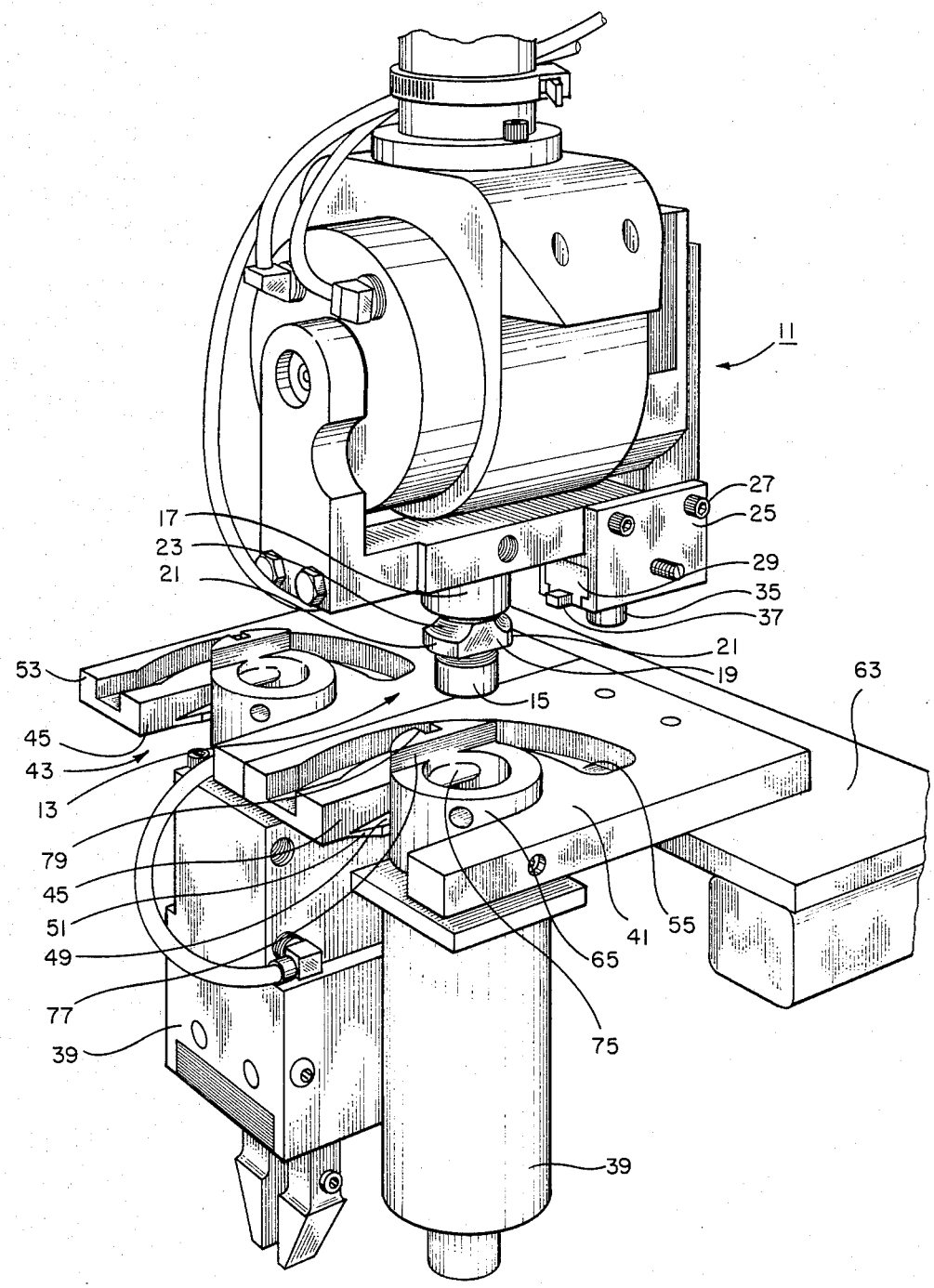
FIG. 1 is a perspective view of the preferred embodiment of the invention.

FIG. 1 illustrates a typical chuck 11 connected to a robot arm (not shown). A chuck coupling member 13 extends downward from the bottom of the chuck 11. In the preferred embodiment this coupling member 13 is a mandrel. The coupling member or mandrel 13 has a lower section 15 and an upper section 17, which are cylindrical and concentric, although the upper section 17 has a relatively larger diameter.

Between the upper and lower sections 15,17 of the mandrel 13 is an intermediate section having two parallel flat sides 19 and two protruding flanges 21. The two flat sides 19 are spaced apart a distance only slightly longer than the diameter of the lower section 15 of the mandrel 13. The flanges 21 extend outward to a distance approximately equal to the diameter of the upper section 17 of the mandrel 13. A semi-circular groove 23 encircles the mandrel 13 between the upper section 17 and the intermediate section, i.e., the flanges 21 and the flat sides 19.

Figure 2:
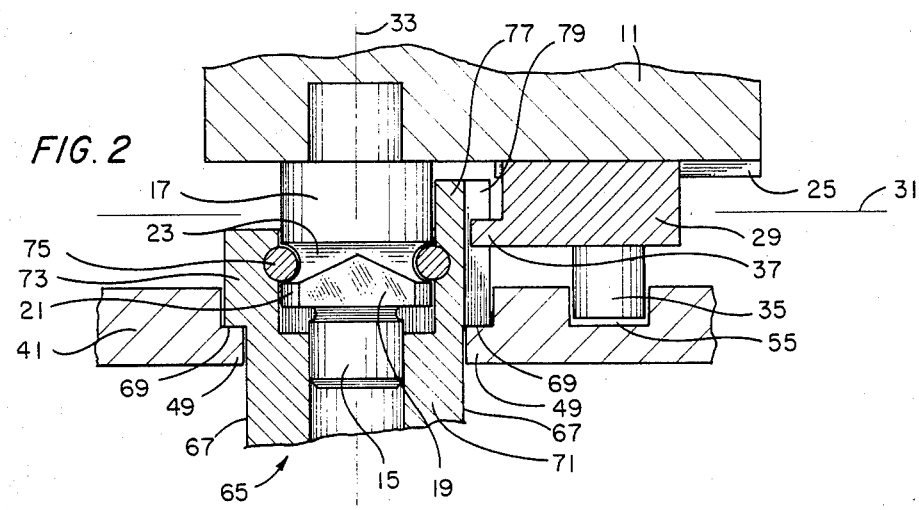
FIG. 2 is a sectional front view, showing the coupling members mated and locked, and the key mated in the key slot.

A rectangular housing 25 is attached to the chuck 11 with bolts 27, so that the housing 25 extends downward from the chuck 11, next to the mandrel 13. The housing 25 contains a sliding member 29, which moves along an axis 31 perpendicular to and intersecting the longitudinal axis 33 of the mandrel 13. These axes 31,33 are shown in FIG. 2. A cylindrical cam follower 35 extends downward from the bottom of the sliding member 29, and a relatively small rectangular key 37 extends from the side of the sliding member 29 toward the mandrel 13.

In FIG. 1, two typical tools 39 are shown stored in support means 41. The support means 41 is a specially shaped support plate 41, which is shown more clearly in FIG. 5. Each support plate 41 has an opening 43 with parallel sides 45 and a semi-circular end 47 for receiving a tool 39. A support ledge 49 runs along each side 45 of the opening 43, and terminates with a beveled end 51 at a point inward from the front edge 53 of the support plate 41.

A guide slot 55 is located in the top of the support plate 41, near the opening 43. The guide slot 55 opens on the front edge 53 of the support plate 41 and initially has a straight portion 57 which runs parallel to the sides 45 of the opening 43. The slot 55 then curves around to a point 59 directly behind the end 47 of the opening 43. The curved portion 61 of the slot 55 is generally concentric to the semi-circular end 47 of the opening 43.

Any number of support plates 41 may be mounted side-by-side as shown in FIG. 1, in order to provide adequate space for all available tools 39. The support plates 41 may be mounted to a base 63 in any conventional manner.

Figure 3:
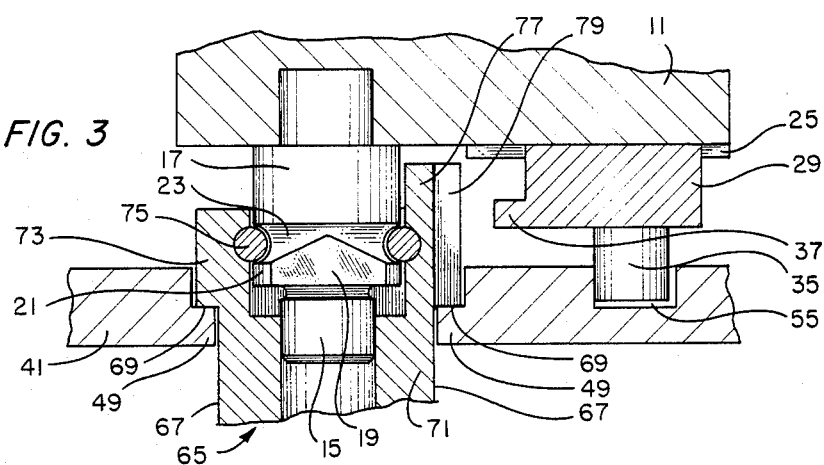
FIG. 3 is a sectional front view, as in FIG. 2, after the key has been disengaged.
Figure 4:
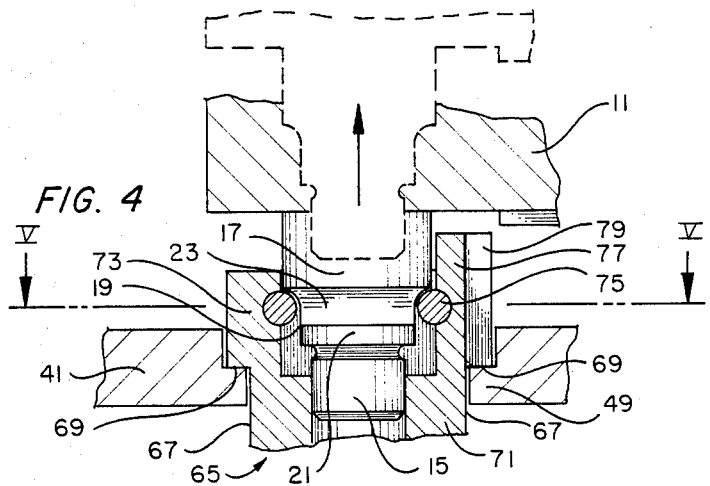
FIG. 4 is a sectional front view, as in FIGS. 2 and 3, after the locking means has been disengaged. The dotted lines illustrate the chuck coupling member being removed from the tool coupling member.

Each tool 39 has a tool coupling member 65 which is generally cylindrical, and which is best shown in FIGS. 2, 3 and 4. The outer diameter of the tool coupling member 65 is slightly less than the distance between the two sides 45 of the opening 43 and the circumference of the coupling member 65 fits snugly into the semi-circular end 47 of the opening 43. Two parallel flat sides 67 on the coupling member 65 form two shoulders 69 to rest upon the support ledges 49. The flat sides 67 of the coupling member 65 are spaced apart at a distance which is slightly less than the distance between the two support ledges 49.

The lower portion 71 of the tool coupling member 65 has an inner diameter which is slightly larger than the diameter of the lower section 15 of the mandrel 13. The inner diameter of the upper portion 73 of the coupling 65 is slightly larger than the diameter of the upper section 17 of the mandrel 13. Two cylindrical lugs 75 extend across the sides of the inner diameter of the upper portion 73 of the coupling member 65. These lugs 75 are oriented parallel to the flat sides 17 of the coupling 67 and have a radius which is approximately the same or slightly smaller than the groove 23 around the mandrel 13. The lugs 75 are spaced apart at a distance which is slightly greater than the distance between the two flat sides 19 of the mandrel 13 and the diameter of the mandrel 13 in the middle of the groove 23.

On one side of the tool coupling member 65 the upper portion 73 has a raised section 77 which has a curved side which is a continuation of the outer diameter of the upper portion 73, and a flat side which is tangential to the inner circumference of the upper portion 73 and parallel to the lugs 75. A key slot 79 is positioned on the outside surface of the tool coupling member 65, extending from the top of the raised section 77 to the shoulder 69. The key slot 79 is rectangular and is slightly larger than the key 37 on the sliding member 29.

In operation, a tool 39 is installed on the chuck 11 by first orienting the chuck 11 so that the mandrel 13 is aligned with the tool coupling member 65, as shown in FIG. 1. The mandrel 13 and the tool coupling member 65 are sized so that the mandrel 13 mates telescopically into the coupling member 65. The chuck 11 is also oriented with the cam follower 35 directly above the guide slot 55 at a point 59 behind the end 47 of the opening 43.

Then, the chuck 11 is moved toward the tool 39 until the mandrel 13 mates within the tool coupling member 65 and the cam follower 35 enters the guide slot 55. At this time the cam follower 35 is in the position shown in dotted lines in FIG. 5 and the mandrel 13 is in the position shown in FIG. 4. The lower section 15 of the mandrel 13 is in the lower part 71 of the tool coupling member 65 and the upper section 17 of the mandrel 13 is in the upper portion 73 of the coupling 65. The flat sides 19 of the mandrel 13 are parallel to the lugs 75, so that the flanges 21 on the mandrel 13 may pass by to a point below the lugs 75. The lugs 75 and the groove 23 are aligned at this point.

The next step is to move the chuck 11 in a plane transverse to the axis 33 of the mandrel 13, causing the cam follower 35 to follow the guide slot 55. This rotates the mandrel 13 relative to the tool coupling member 65, which is held against rotation by the support plate 41. When the mandrel 13 has been rotated 90 degrees, it is in the position shown in FIG. 3. The flanges 21 are now locked under the lugs 75, thus forming locking means for securing the tool coupling member 65 to the mandrel 13. Also, the key 37 on the sliding member 29 is aligned with the key slot 79 in the tool coupling member 65, although the key 37 and the key slot 79 are not yet mated.

The chuck 11 then moves the tool coupling member 65 toward the front edge 53 of the support plate 41. As the coupling member 65 approaches the edge 53 of the support 41, the guide slot 55 forces the cam follower 35 toward the mandrel 13. This causes the sliding member 29 to slide in the housing 25 toward the tool coupling member 65 until the key 37 enters the key slot 79. At this point the apparatus is in the position illustrated in FIG. 2. The tool 39 can then be removed from the support plate 41 and controlled by the chuck 11.

To remove a tool 39 from the chuck 11, the operation is reversed. The chuck 11 directs the tool 39 so that the tool coupling member 65 enters the opening 43 in the support plate 41 and the cam follower 35 enters the guide slot 55 at the front edge 53 of the support plate 41. As the tool coupling member 65 is moved onto the ledges 49, the guide slot 55 and the cam follower 35 act as guide means to withdraw the key 37 from the key slot 79.

The chuck 11 is then moved transversely to the axis 33 of the mandrel 13, so that the guide slot 55 and the cam follower 35 further act as guide means for rotating the mandrel 13 relative to the tool coupling member 65. When the mandrel 13 has been rotated 90 degrees, it is again in the position of FIG. 4, wherein the flanges 21 have been released from under the lugs 75. The chuck 11 can then remove the mandrel 13, as shown in dotted lines in FIG. 4, leaving the tool 39 stored in the support plate 41.

The invention has significant advantages. The tool can be coupled and uncoupled from the robot arm without manual assistance by an operator. The chuck of the arm needs only means for moving upward and downward. Rotary movement between the chuck and tool is accomplished by use of the guide slot.

While the invention has been shown in only one of its forms, it should be apparent to those skilled in the art that it is not so limited, but is susceptible to various changes and modifications without departing from the spirit thereof.

We claim:

1. An apparatus for installing and removing a tool on a chuck connected to a robot arm, comprising:
    a tool coupling member on the tool;
    a chuck coupling member on the chuck, adapted to mate with the other tool coupling member;
    locking means for securing the coupling members together when the coupling members are aligned in a locked position, and for releasing the coupling members when the coupling members are rotated a selected distance of less than 360° relative to one another;
    support means for receiving and preventing rotation of the tool coupling member; and
    guide means on one of said support means and said chuck and coacting means on one of said support means and said chuck for causing the chuck coupling member to rotate relative to the tool coupling member when the chuck places the tool coupling member in the support means and moves relative to the support means.

2. The apparatus recited in claim 1, wherein the tool coupling member is cylindrical, and the chuck coupling member is a mandrel extending from the chuck into the tool coupling member, so that the coupling members mate telescopically.

3. The apparatus as recited in claim 1, wherein the locking means comprises:
    a lug on one of the coupling members; and
    a flange on the other coupling member, to lock under the lug when the coupling members are aligned in a locked position, and to release the lug when the coupling members are rotated a selected distance of less than 360° relative to one another.

4. The apparatus as recited in claim 1, wherein the guide means is a cam follower extending from the chuck into a curved guide slot in the support means.

5. The apparatus as recited in claim 1, further comprising:
 a key on a selected one of the chuck or the tool coupling member;
 the other of the chuck or the tool coupling member having a key slot adapted to mate with the key; and
 wherein the guide means causes the key and the key slot to be mated when the coupling members are aligned in a locked position, and disengaged when the coupling members are rotated a selected distance of less than 360° relative to one another.

6. The apparatus as recited in claim 2, wherein the locking means comprises:
 a lug on one of the coupling members; and
 a flange on the other coupling member, to lock under the lug when the coupling members are aligned in a locked position, and to release the lug when the coupling members are rotated a selected distance of less than 360° relative to one another.

7. The apparatus as recited in claim 6, further comprising:
 a key on a selected one of the chuck or the tool coupling member;
 the other of the chuck or the tool coupling member having a key slot adapted to mate with the key; and
 wherein the guide means causes the key and the key slot to be mated when the coupling members are aligned in a locked position, and disengaged when the coupling members are rotated a selected distance of less than 360° relative to one another.

8. The apparatus as recited in claim 2, wherein the guide means is a cam follower extending from the chuck into a curved guide slot in the support means.

9. The apparatus as recited in claim 8, further comprising:
 a key on a selected one of the chuck or the tool coupling member;
 the other of the chuck or the tool coupling member having a key slot adapted to mate with the key; and
 wherein the guide means causes the key and the key slot to be mated when the coupling members are aligned in a locked position, and disengaged when the coupling members are rotated a selected distance of less than 360° relative to one another.

10. The apparatus as recited in claim 2, further comprising:
 a key on a selected one of the chuck or the tool coupling member;
 the other of the chuck or the tool coupling member having a key slot adapted to mate with the key; and
 wherein the guide means causes the key and the key slot to be mated when the coupling members are aligned in a locked position, and disengaged when the coupling members are rotated a selected distance of less than 360° relative to one another.

11. The apparatus as recited in claim 3, wherein the guide means is a cam follower extending from the chuck into a curved guide slot in the support means.

12. The apparatus as recited in claim 11, further comprising:
 a key on a selected one of the chuck or the tool coupling member;
 the other of the chuck or the tool coupling member having a key slot adapted to mate with the key; and
 wherein the guide means causes the key and the key slot to be mated when the coupling members are aligned in a locked position, and disengaged when the coupling members are rotated a selected distance of less than 360° relative to one another.

13. The apparatus as recited in claim 3, further comprising:
 a kay on a selected one of the chuck or the tool coupling member;
 the other of the chuck or the tool coupling member having a key slot adapted to mate with the key; and
 wherein the guide means causes the key and the key slot to be mated when the coupling members are aligned in a locked position, and disengaged when the coupling members are rotated a selected distance of less than 360° 1 relative to one another.

14. The apparatus as recited in claim 4, further comprising:
 a key on a selected one of the chuck or the tool coupling member; the other of the chuck or the tool coupling member having a key slot adapted to mate with the key; and
 wherein the guide means causes the key and the key slot to be mated when the coupling members are aligned in a locked position, and disengaged when the coupling members are rotated a selected distance of less than 360° relative to one another.

15. An apparatus for installing and removing a tool on a chuck connected to a robot arm, comprising:
 a cylindrical tool coupling member on the tool, having a lug;
 a mandrel extending from the chuck and adapted to be received into the tool coupling member, the mandrel having a protruding flange means to lock under the lug when the mandrel and the tool coupling member are aligned in a locked position, and to release the lug when the mandrel is rotated a selected distance of less than 360° relative to the tool coupling member; and
 support means for holding the tool against rotation, the support means having a curved guide slot;
 a cam follower, extending from the chuck into the guide slot, to rotate the mandrel relative to the tool coupling member as the chuck moves relative to the support means.

16. The apparatus as recited in claim 15, further comprising:
 a key on a selected one of the chuck or the tool coupling member;
 the other of the chuck or the tool coupling member having a key slot adapted to mate with the key; and
 wherein the guide means causes the key and the key slot to be mated when the coupling members are aligned in a locked position, and disengaged when the coupling members are rotated a selected distance of less than 360° relative to one another.

17. A method of installing a tool on a chuck connected to a robot arm, comprising the steps of:
 providing a support plate to hold the tool against rotation, said support plate having a curved guide slot;
 orienting the chuck so that a chuck coupling member on the chuck is aligned with a tool coupling member on the tool;
 moving the chuck toward the tool until the coupling members mate and a cam follower on the chuck enters the guide slot; and
 moving the chuck in a plane transverse to the axis of the coupling members, so that the cam follower follows the guide slot and rotates the chuck coupling member relative to the tool coupling member, to lock the coupling members together.

* * * * *